April 2, 1935. A. S. MITCHELL 1,996,728
APPARATUS FOR AND METHOD OF PRODUCING UPHOLSTERY
Filed July 5, 1932 10 Sheets-Sheet 5
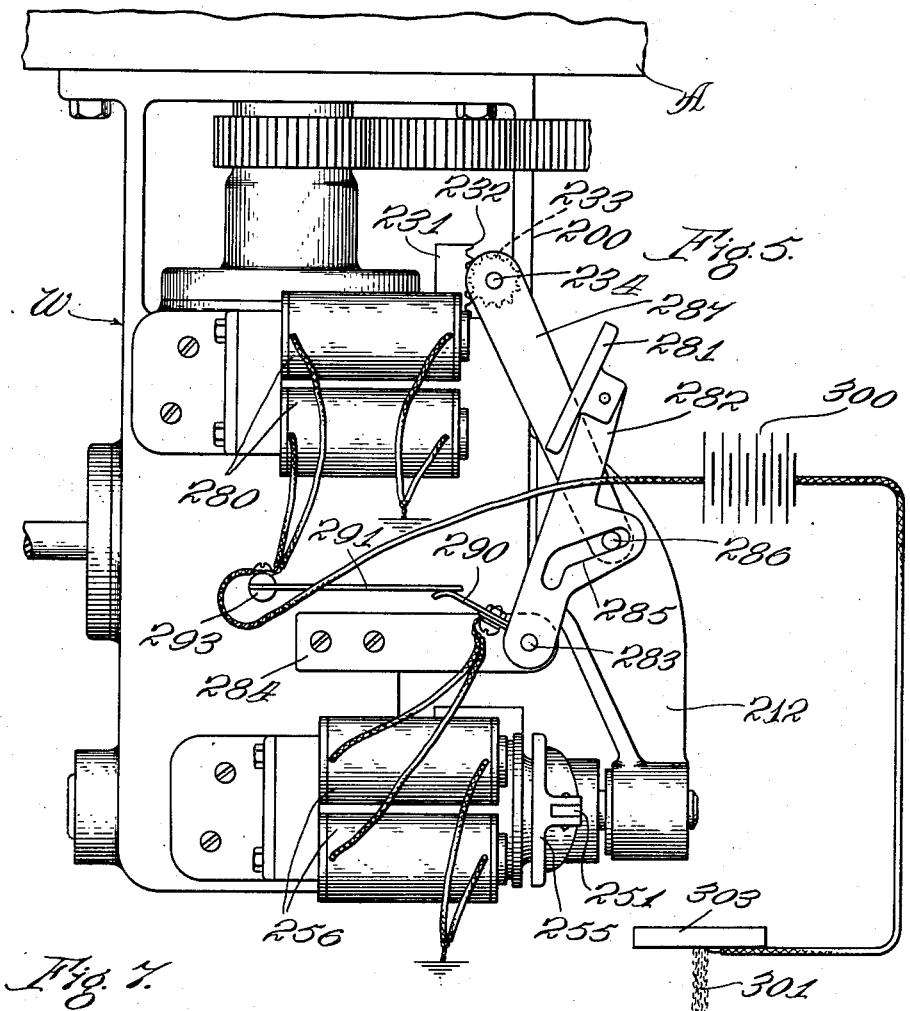
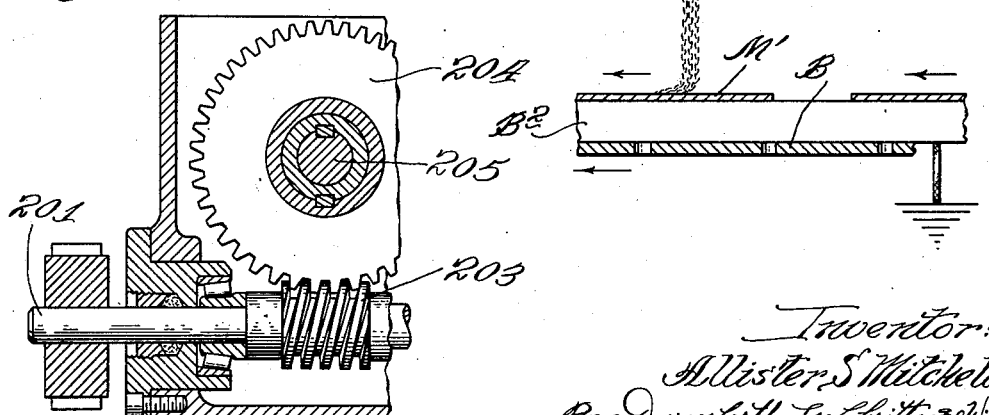

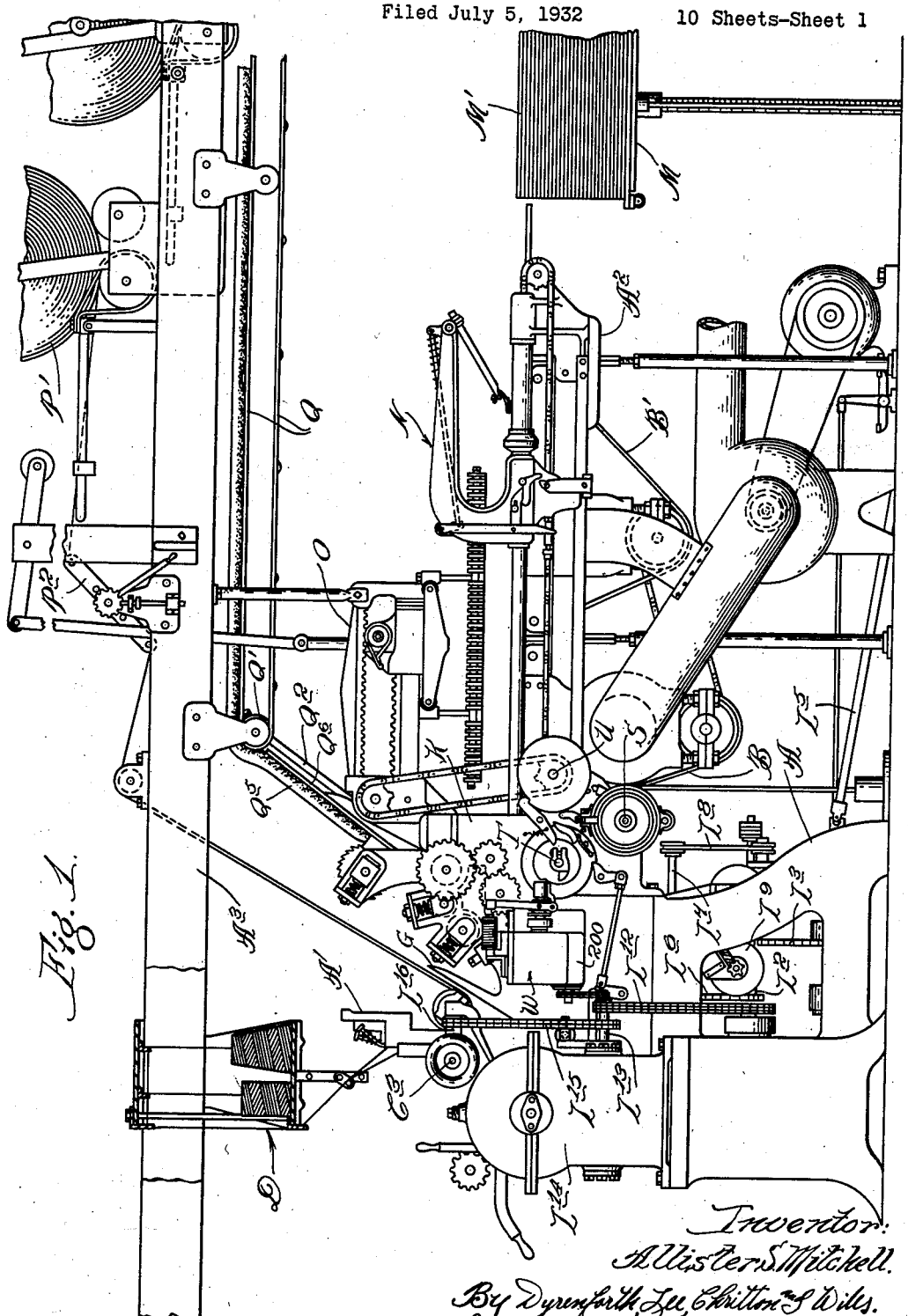

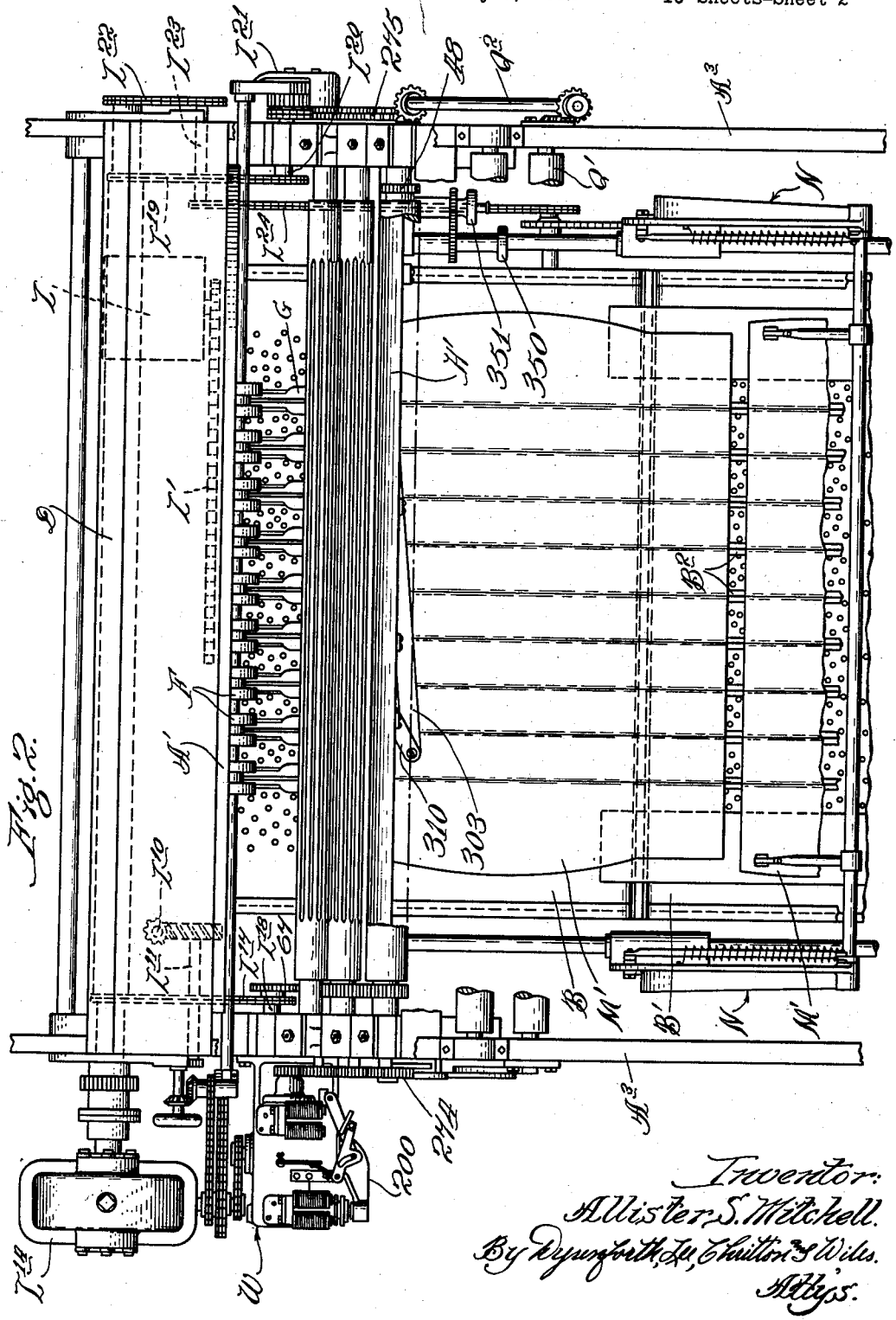

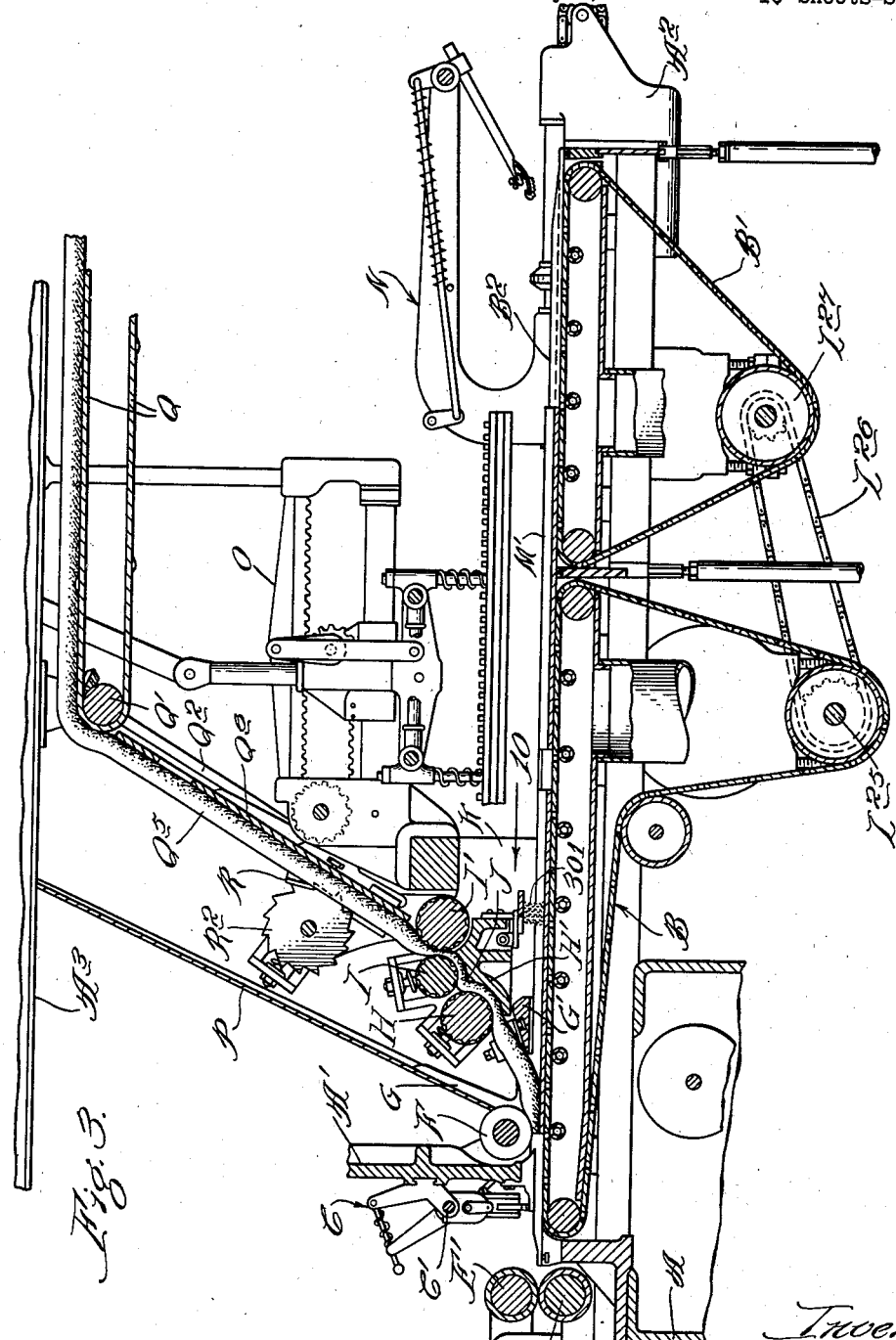

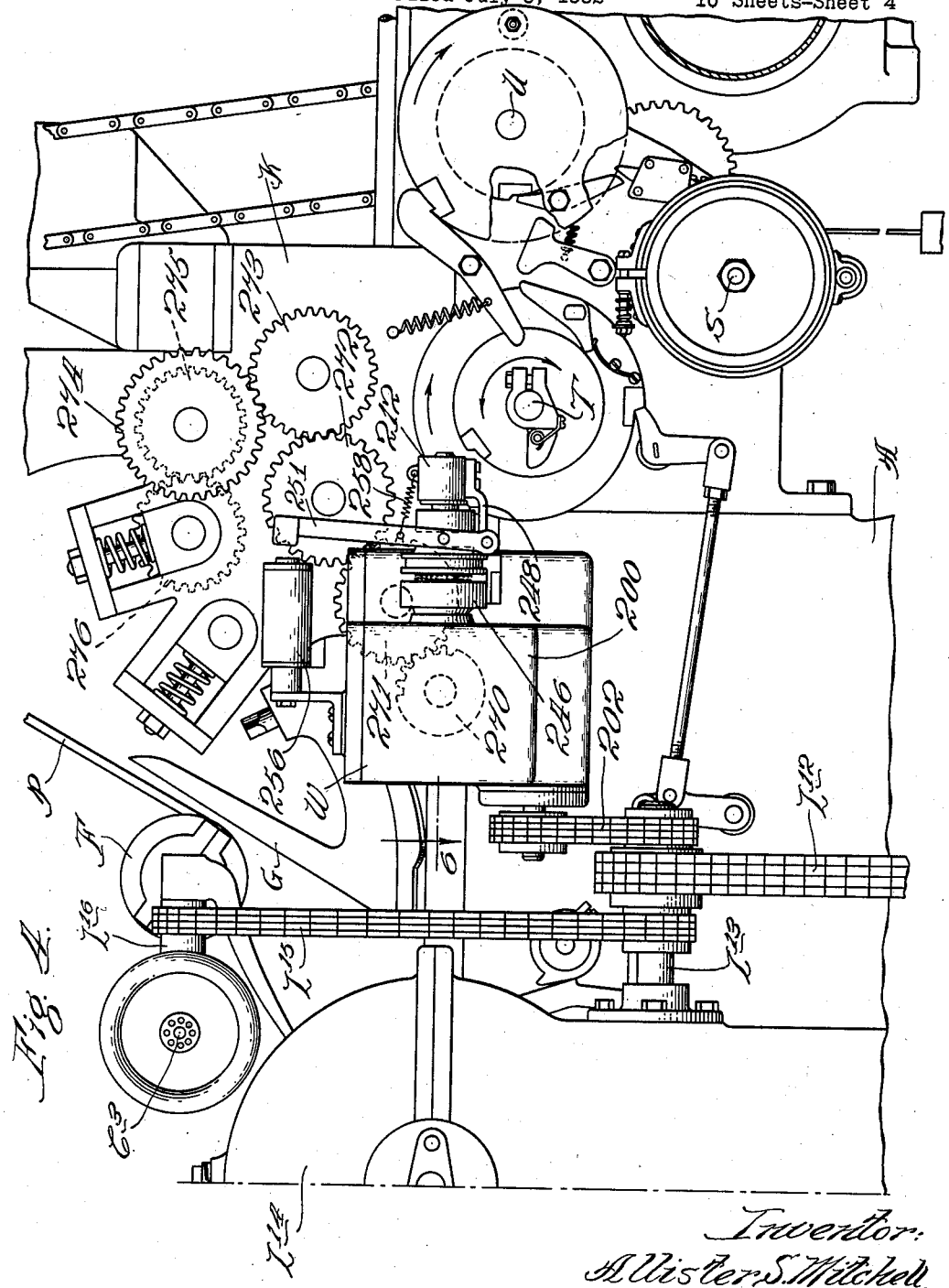

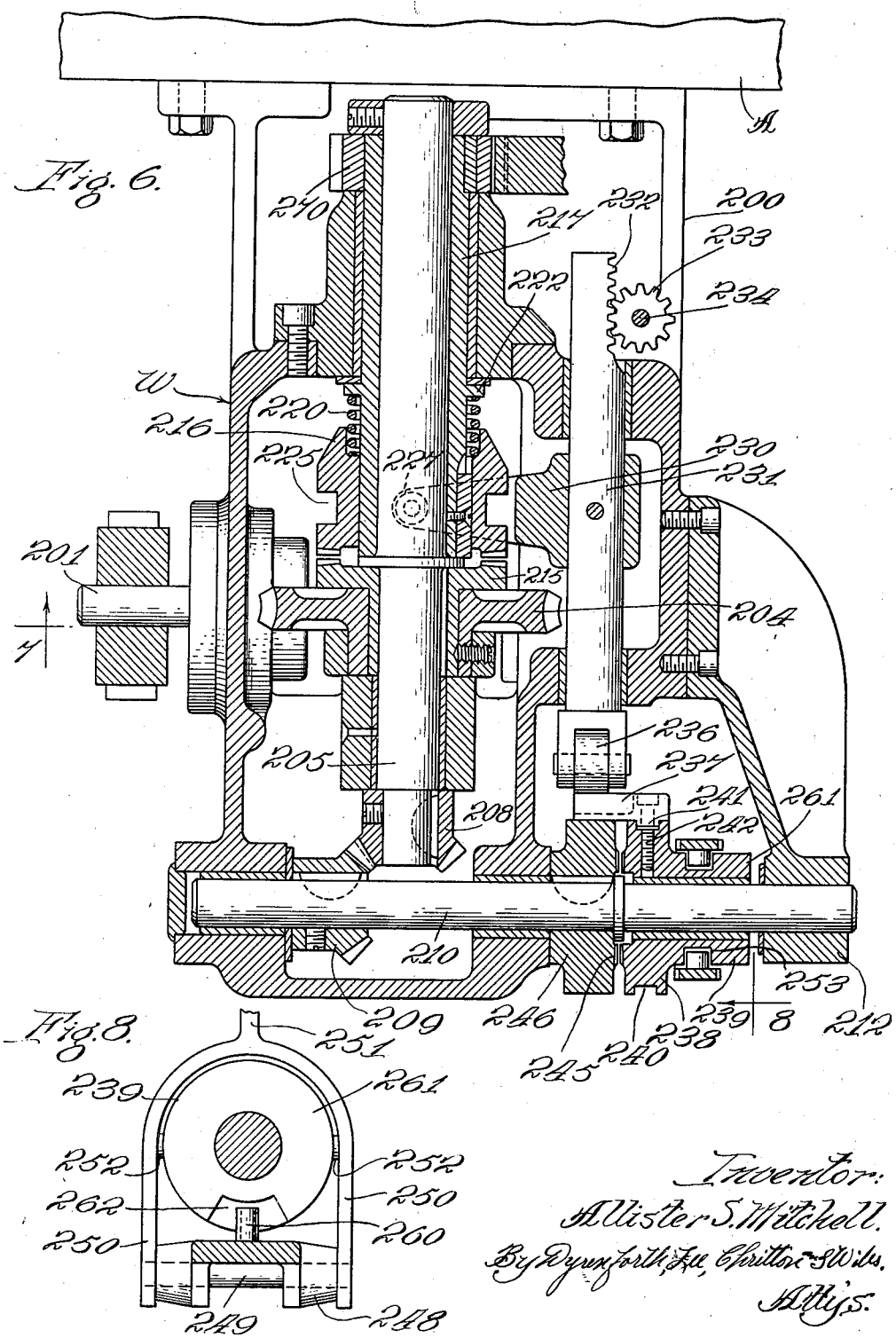

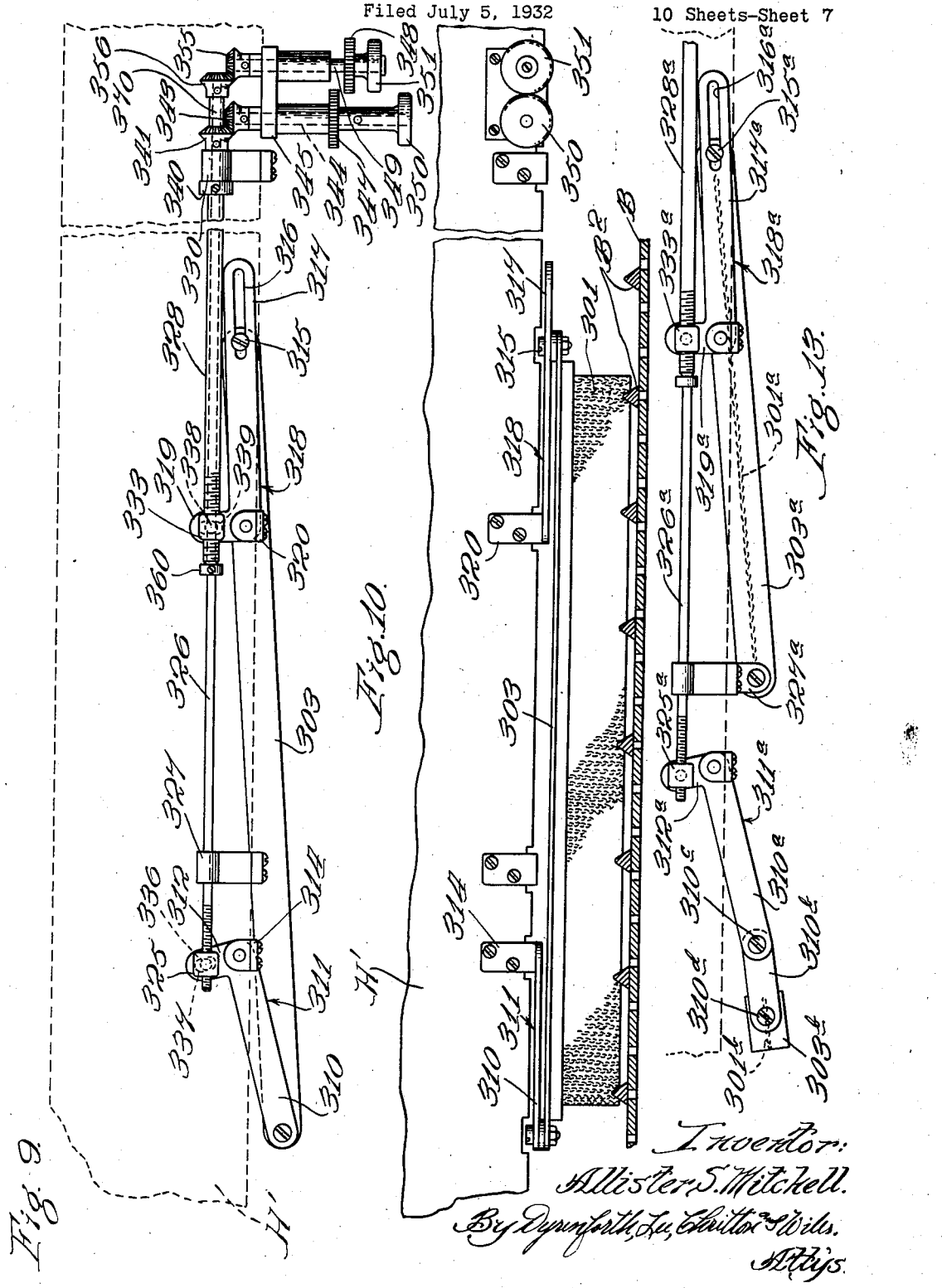

April 2, 1935.  A. S. MITCHELL  1,996,728
APPARATUS FOR AND METHOD OF PRODUCING UPHOLSTERY
Filed July 5, 1932   10 Sheets-Sheet 8
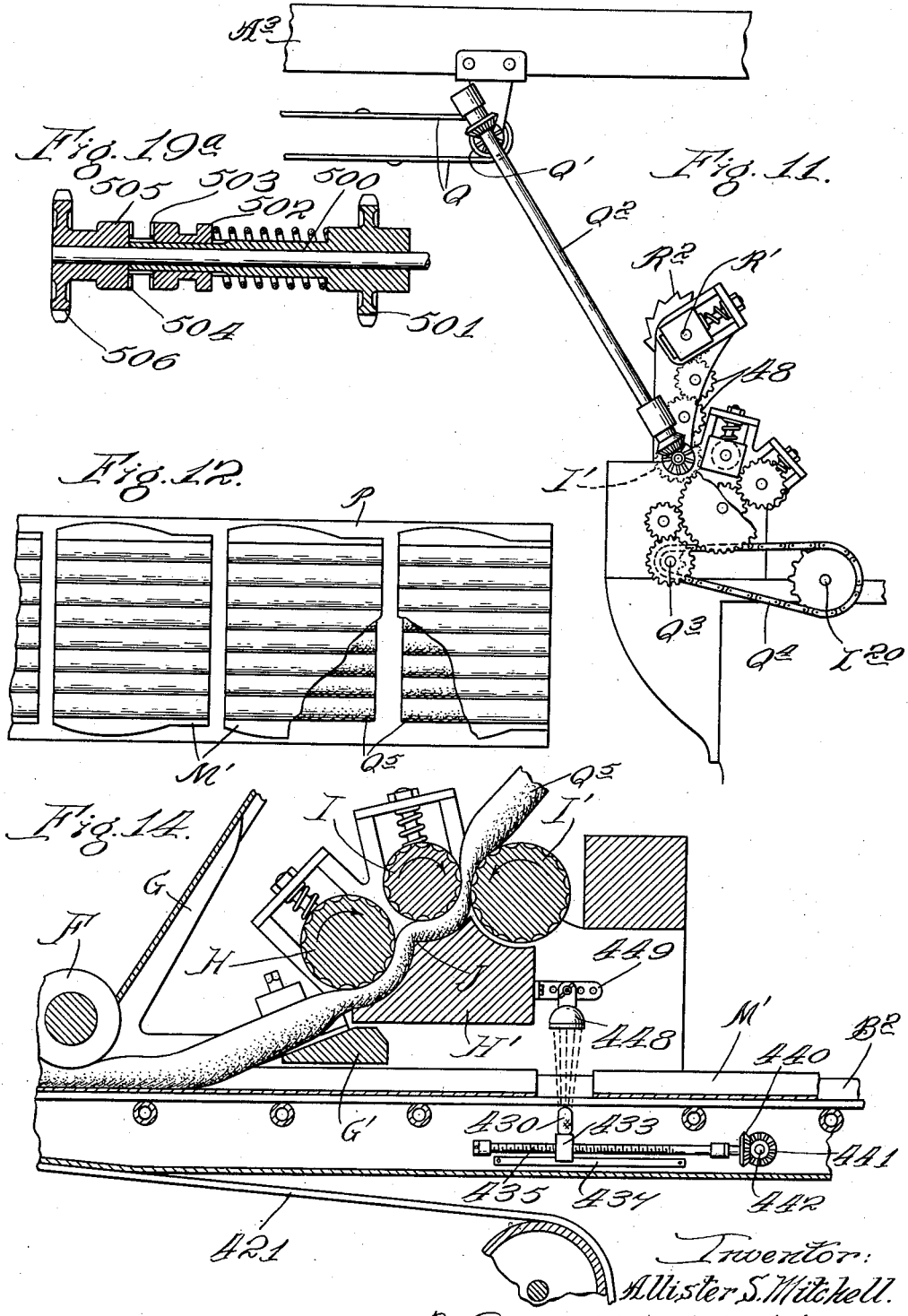

April 2, 1935.  A. S. MITCHELL  1,996,728
APPARATUS FOR AND METHOD OF PRODUCING UPHOLSTERY
Filed July 5, 1932    10 Sheets-Sheet 9
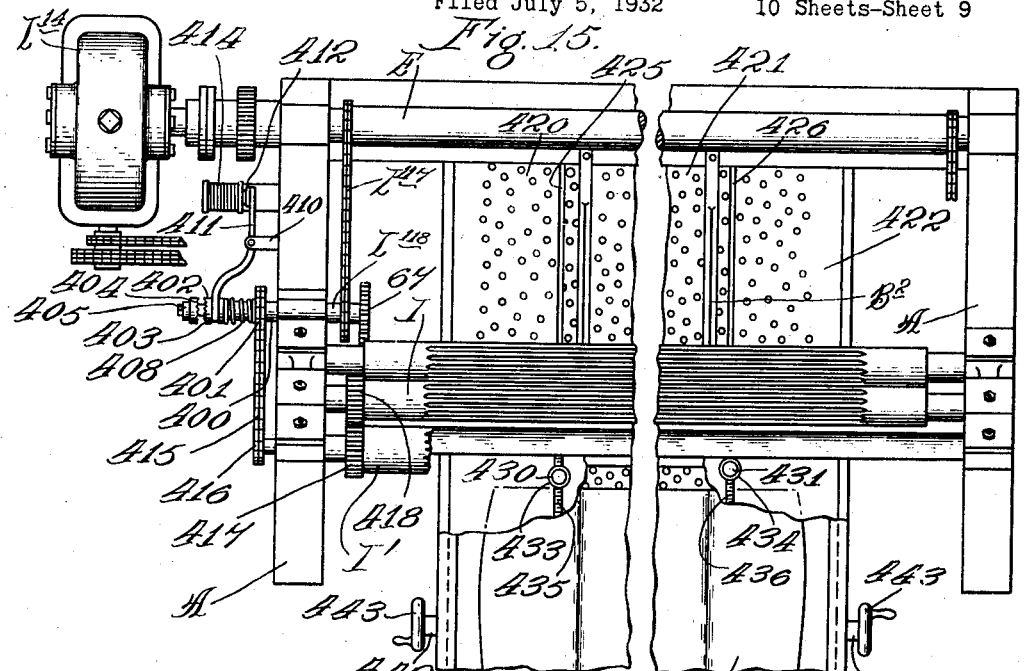
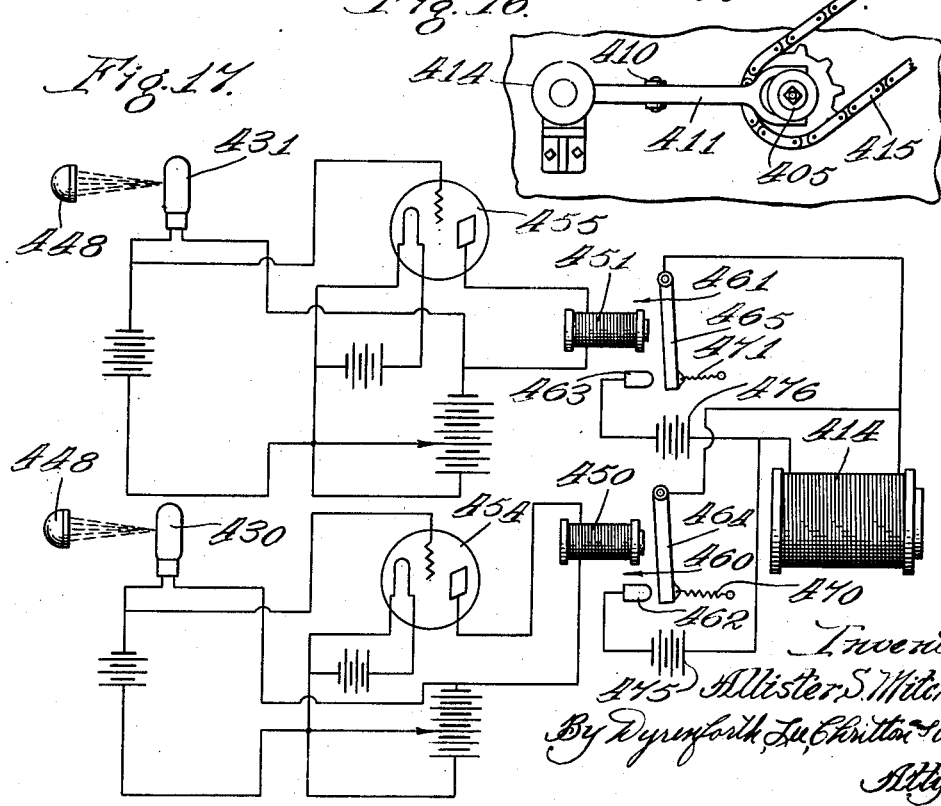
Inventor:
Allister S. Mitchell.
By Dyrenforth, Lee, Chritton & Wiles.
Attys.

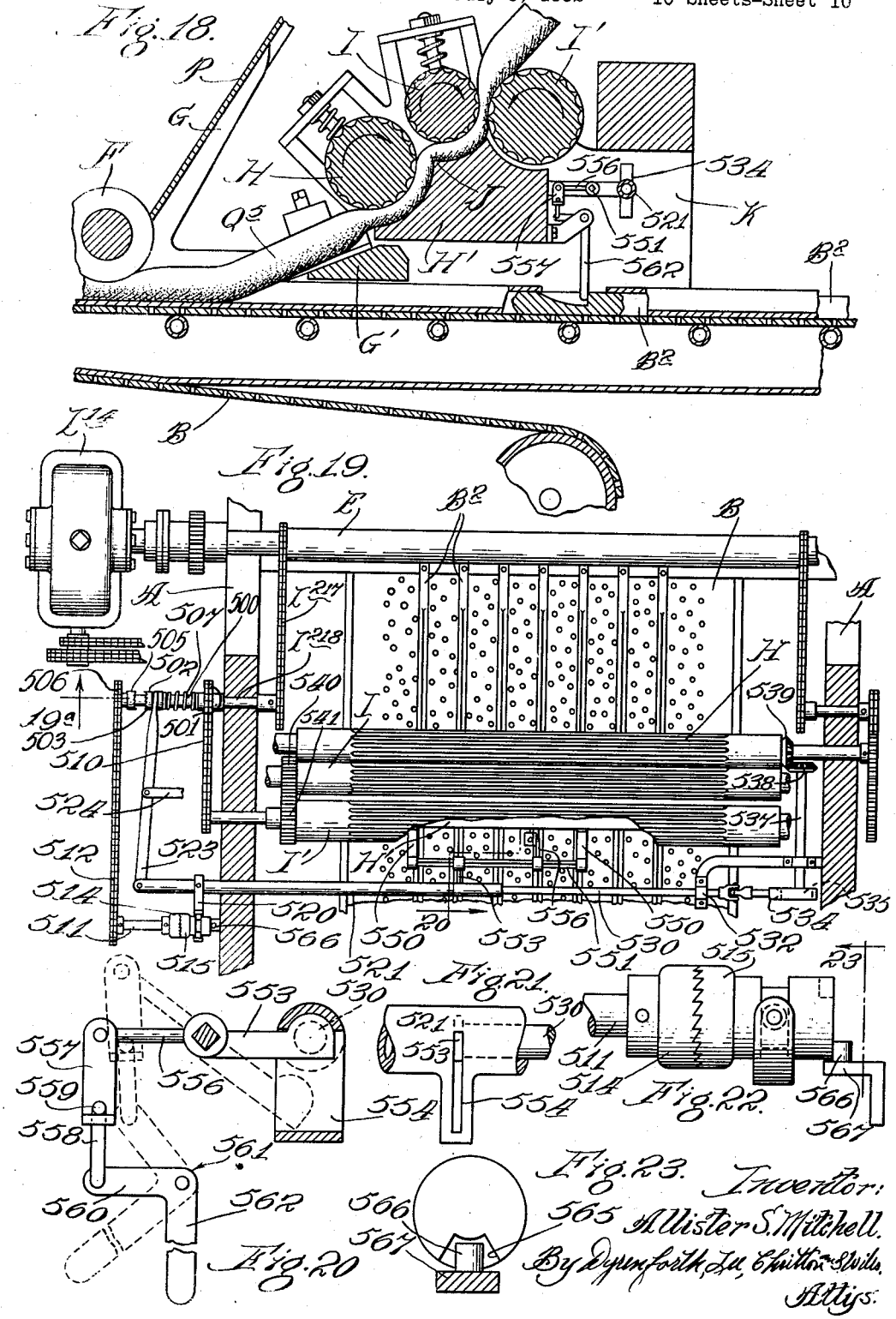

Patented Apr. 2, 1935

1,996,728

UNITED STATES PATENT OFFICE 1,996,728

APPARATUS FOR AND METHOD OF PRO-
DUCING UPHOLSTERY

Allister S. Mitchell, Detroit, Mich., assignor to
National Automotive Fibres, Inc., Detroit,
Mich., a corporation of Delaware Application July 5, 1932, Serial No. 620,955

34 Claims. (Cl. 112—2)

The invention relates to apparatus for and a method of manufacturing upholstery and is particularly adapted to be embodied in a machine for manufacturing stuffed, pleated automobile seat-cushions, box-cushions, etc.

The primary object of the invention is to provide an improved method and an improved machine for manufacturing stuffed upholstery from pre-cut covers, batting and lining fabric.

More particularly, it is an object of the invention to provide a continuously operating machine in which there will be no waste of the batt-material.

One form of the invention is embodied in a machine which comprises means for advancing the lining material continuously, the pre-cut covers being fed to the lining fabric in spaced relation. The machine also comprises batt-feeding means controlled by electrical apparatus which, in turn, is controlled by the pre-cut covers. The electrical apparatus comprises a metallic mesh or curtain adapted to contact with the frame of the machine to close an electrical circuit which then actuates means to sever the batt-material and stop the feed of the unsevered portion. The metallic mesh or curtain lies in the path of the pre-cut covers and will be disengaged from the frame of the machine when a pre-cut cover is advanced to the lining fabric. This opens the electrical circuit and permits the batt-feeding mechanism to function. The construction is such that batts will be fed to the lining fabric only when a pre-cut cover is fed thereto and the batts may be of any desired length. Thus, they may be of the same length as the pre-cut covers or shorter. The improved machine comprises means for forming seam-ridges and pleat-fulnesses in the pre-cut covers, the seam-ridges of the pre-cut covers being sewed to the lining fabric in such manner that the batts are disposed in the pleat-fulnesses.

Another form of the invention is embodied in a machine which comprises photo-electric tubes controlled by the pre-cut covers in such manner that the batt-feeding mechanism functions in the same manner as the first machine described above.

Still another form of the invention is embodied in a machine which comprises only mechanical parts for controlling the batt-feeding mechanism, the mechanical parts being controlled by the pre-cut covers so that the improved machine functions in the same manner as the two machines described above.

Other objects and advantages will become apparent as the following detailed description progresses, reference being had to the accompanying drawings, wherein—

Figure 1 is a broken side elevation of the improved machine; Figure 2, a broken plan view of the machine; Figure 3, a broken fragmentary longitudinal section taken through the machine; Figure 4, an enlarged fragmentary view looking at the same side of the machine as in Figure 1; Figure 5, a plan view of some of the apparatus shown in Figure 4, an electrical circuit being illustrated diagrammatically in connection with certain electro-magnets which form part of the improved machine; Figure 6, a broken sectional view taken on line 6 of Figure 4; Figure 7, fragmentary section taken as indicated at line 7 of Figure 6; Figure 8, a fragmentary section taken as indicated on line 8 of Figure 6; Figure 9, a plan view of adjustable mechanism which co-operates with the pre-cut fabric-covers to control the batt feeding and severing means; Figure 10, a fragmentary section taken as indicated at line 10 of Figure 3; Figure 11, a broken side elevation illustrating the apparatus for driving the batt conveyor; Figure 12, a plan view of the upholstery as it appears when it is discharged from the improved apparatus; Figure 13, a plan elevation of mechanism embodying another form of the invention and adapted to be employed in place of the mechanism illustrated in Figure 9; Figure 14, a longitudinal vertical fragmentary section through apparatus which embodies another form of the invention; Figure 15, a plan view of the improved apparatus shown in Figure 14; Figure 16, a fragmentary side elevation of some of the apparatus shown in Figure 15; Figure 17, a diagram of an electrical circuit forming part of the apparatus shown in Figures 14 to 16, inclusive; Figure 18, a broken vertical longitudinal section through apparatus which embodies still another form of the invention; Figure 19, a plan view of the apparatus shown in Figure 18; Figure 19A, a fragmentary section taken as indicated on line 19A of Figure 19; Figure 20, a fragmentary section taken as indicated on line 20 of Figure 19; Figure 21, a fragmentary side view of a sleeve and push-rod which form parts of the apparatus shown in Figures 18 to 20, inclusive; Figure 22, a fragmentary side view of a clutch and means for controlling it, said clutch and controlling means being part of the apparatus illustrated in Figures 18 to 21, inclusive; and Figure 23, a section taken as indicated at line 23 of Figure 22.

Most of the apparatus illustrated in Figures 1 to 10, inclusive, is substantially identical with the apparatus shown and described in my co-pending application S. N. 572,691, filed November 2, 1931 and therefore it will be unnecessary to describe, in detail, such mechanisms as the sewing mechanism, the mechanism for shaping the pre-cut covers into pleat-fulnesses and intervening seam-ridges, the batt-feeding mechanism, the lining fabric-feeding mechanism, the pre-cut cover placing and advancing mechanism, etc., as these mechanisms are disclosed fully in the co-pending application. The present invention is embodied in an improved upholstery machine which comprises novel apparatus for controlling the batt-feeding and severing mechanism and the detailed descriptions of the several illustrated embodiments of the invention will include so much description as is necessary to enable one skilled in the art to understand fully the manner in which the apparatus shown in the co-pending application has been modified to co-operate with the apparatus which forms the present invention. Reference may be made to the co-pending application for detailed description and illustration of details which do not form a part of the present invention.

Referring for the present to Figures 1 to 12, inclusive, A designates a main frame which is equipped near its front end with a vertically adjustable cross-head, A', the frame being provided with a bed-extension $A^2$ over which the pre-cut covers are fed; $A^3$, a frame-work which serves as a support for a batt-conveyor and other devices disposed over the frame A; B, a front section-conveyor mounted in the bed of the machine; B', an auxiliary conveyor disposed back of the conveyor B; $B^2$, longitudinally extending ridge-bars which extend over both conveyors and have their front ends extending through peripheral grooves in a forming-roll F mounted on the cross-head A'; C, a series of sewing mechanisms mounted on the cross-head A' and laterally adjustable thereon to enable the width of the pleats to be varied, said sewing-mechanisms being actuated by a common shaft C' which is driven through the medium of an intermediate coupling-shaft (not shown) from a shaft $C^3$ journaled in the main frame; D, a thread-supporting device positioned above the sewing-mechanisms and supported from the frame $A^3$; E and E', a pair of front feed-rolls by which the upholstery is drawn through the front end of the machine and from which the upholstery passes to the delivery mechanism (not shown) which serves to fold it; F, the forming-roll identified above, which forming-roll has spaced circumferential grooves through which the ridge bars $B^2$ extend; G, a series of lining-creasers adjustably mounted on a transverse bar G' carried by the frame; H, a front batt-feeding roll which co-operates with a concave H', I, I', an auxiliary pair of batt-feeding rolls journaled in supports carried by the main frame, said auxiliary rolls being arrested at the proper times to cause severence of the batts; J, a shearing edge forming a part of the concave H' and disposed immediately back of the front batt-feeding roll H; K, K, mounting blocks carried by the main frame and supporting the batt-feeding rolls and the associated concave; L, an electric motor disposed under the front portion of the frame of the machine, which motor actuates through the medium of a chain or belt L', a counter-shaft $L^2$ (Fig. 1); $L^3$, a sprocket chain actuated by the shaft $L^2$ and serving to actuate reversing gear mechanism (not shown), this mechanism serving to actuate a rearwardly and downwardly inclined shaft $L^5$ which serves to actuate the elevator or cover fabric support; $L^6$, a sprocket chain which serves to actuate a jack-shaft $L^7$, which, in turn, actuates a belt $L^8$ through the medium of which a variable speed transmission $L^9$ is actuated; $L^{10}$, a shaft actuated by the variable speed mechanism $L^9$ and serving in turn to actuate a horizontal shaft $L^{11}$, the shaft $L^{11}$ serving to actuate a cam shaft which controls the piece-placing mechanism and the fabric-forming mechanism; $L^{12}$, a sprocket chain driven by the shaft $L^2$ and serving to drive a shaft $L^{13}$ which, in turn, operates through a speed-reducing mechanism $L^{14}$ to actuate the lower upholstery-feeding roll E; $L^{15}$, a sprocket chain actuated from the shaft $L^{13}$ and serving to actuate a short horizontal shaft $L^{16}$, which as shown in Fig. 1 serves to actuate the shaft $C^3$; $L^{19}$, a sprocket chain driven by the lower feed roll E and serving to actuate a shaft $L^{20}$, from which power is communicated through transmission means $L^{21}$ to the forming roll F; $L^{22}$, a sprocket chain driven from the lower feed roll E and serving to actuate a short transverse shaft $L^{23}$, which actuates a sprocket chain $L^{24}$, serving to transmit power to a shaft $L^{25}$, (Fig. 3) which actuates the front suction-conveyor B; $L^{26}$, a sprocket chain driven by the shaft $L^{25}$ and serving to drive a roll $L^{27}$, which actuates the rear suction-conveyor B'; M, a slowly elevated fabric-support or cover-support which serves to elevate a stack M' of pre-cut covers; N, a piece-placing mechanism adapted to position the pre-cut covers on the bed of the machine; O, fabric forming mechanism co-operating with the suction-conveyors and the ridge-bars in forming the covers into seam-ridges and intervening pleat-fulnesses; P, a lining-fabric which is drawn from a roll P' about a tensioning device $P^2$ and thence to the forming roll F; Q, a batt-conveyor supported on the frame $A^3$, said conveyor having a front propeller-roll Q' which is actuated by a shaft $Q^2$ driven by means operatively connecting it to the batt-feeding roll I' (Fig. 11); $Q^3$, a continuously driven shaft operatively connected to the shaft $L^{20}$ by a sprocket chain $Q^4$, the shaft $Q^3$ being connected by suitable gearing, as shown in Fig. 11, to the batt-feeding roll H which is driven continuously; $Q^5$, batts carried by the conveyor Q and descending from the front end thereof over an inclined plate $Q^6$ to the batt-feeding rolls I and I'; R, a series of guides or short chutes mounted on the main frame and serving to guide the batts to the rolls I and I'; and R', a transverse shaft equipped with toothed batt-feeding and directing discs $R^2$ which serve to direct and feed the batts through the chutes R, the shaft R' being actuated by a train of gears 48 which are driven by the roll I' so that the toothed discs $R^2$ will be arrested when the auxiliary rolls I and I' are arrested to cause severance of the batts.

Again referring to the drawings, $L^{17}$ designates a sprocket chain which, as shown in Fig. 2, is driven by the lower feed roll E and serves to actuate a shaft $L^{18}$, the shaft $L^{18}$ being connected operatively by means including a gear 67 to a shaft S which rotates continuously (Fig. 4); T, a shaft to which motion is transmitted periodically from the shaft S through suitable transmision mechanism; and U, a shaft to which motion is transmitted periodically through suitable transmission mechanism.

The means operatively connecting the shaft $L^{18}$ with the shaft S and the means operatively connecting the shaft S with the shafts T and U are illustrated in detail in the above identified co-pending application. The shaft T actuates the piece-placing mechanism N. The shaft U actuates the fabric-forming mechanism O. The means which operatively connects the shaft T with the piece-placing mechanism and the means which operatively connects the shaft U with the fabric-forming mechanism are illustrated in detail in the co-pending application.

It may be mentioned at this point in the description that the ridge-bars B², the forming-roll F¹ and the parts co-operating therewith to form the seam-ridges in the lining-fabric and the pre-cut covers may be adjusted in the same manner as the sewing mechanisms are adjusted to enable the width of the pleats to be varied.

Briefly, the operation of the above described apparatus is as follows: Pre-cut covers M' are supported on the elevator M and are removed therefrom and placed by hand on the rear suction-conveyor B' at the proper moment the piece-placing mechanism N operates to feed the cover forwardly into position under the fabric-forming mechanism O. The front suction-conveyor B preferably operates somewhat faster than the rear suction-conveyor so that a certain amount of retarding action is exerted by the rear conveyor, thus causing the fabric to be stretched properly. At the proper instant, the fabric-forming mechanism O operates to form the pre-cut cover over the ridge bars B². Portions of the forming mechanism travel forwardly and are lowered and then lifted and then raised during the forward movement and are maintained in the elevated position during the return stroke of the forming mechanism.

The lining-fabric P passes in back of the forming-roll F and in front of the lining-creasers G, these parts co-operating to form seam-ridges in the lining-fabric which receive the seam-ridges of the covers as the covers pass, ad seriatum, beneath the forming-roll. The seam-ridges are sewn by the sewing mechanism C. The upholstery passes from the sewing mechanism between the feed rolls E and E' which exert a forward pull on the upholstery.

The toothed discs R² not only aid in feeding the batts, but perform the further function of creasing the batts centrally on the side which will lie adjacent the lining-fabric.

The improved means for controlling the batt-feeding rolls I and I' will now be described. This means comprises a transmission device which is designated generally by the reference character W, (Figs. 1, 2, 4 and 5). The transmission device W comprises a housing 200 mounted on the frame A. A shaft 201 journaled in the housing 200 is driven from the shaft L¹³ by means including a sprocket chain 202 (Figs. 1, 4, 6 and 7). A worm 203 fixed to the shaft 201 meshes with a worm gear 204 which is constrained to rotate with a shaft 205 journaled in the housing 200 (Fig. 6). A bevel gear 208 fixed to one end of the shaft 205 meshes with a bevel gear 209 fixed to a shaft 210, the shaft 210 being journaled in the housing 200 and in a bracket member 212 secured to the housing member.

It will be noted that the worm gear 204 is secured to a clutch member 215 which is keyed to the shaft 205. The clutch member 215 is provided with jaws which are engageable with the jaws of a clutch member 216 splined on a sleeve 217 which is journaled on the shaft 205. A spring 220 disposed around the sleeve 217 and interposed between the clutch member 216 and a flange 222 formed on the sleeve 217 yieldingly urges the clutch member 216 into driving engagement with the clutch member 215. The clutch member 216 is provided with an annular groove 225 into which anti-friction rollers 227 project, the rollers 227 being mounted on the bifurcations of a fork 230 which is pinned to a rod 231. The rod 231 is slidably journaled in the housing 200 and is provided at one end with gear teeth 232 which mesh with a pinion 233 fixed to a vertically disposed shaft 234. At its other end, the rod 231 is provided with a roller 236 which is engageable by a cam member 237 which is mounted on the periphery of a flange 238 formed integral with a clutch member 239, the flange 238 being provided with an annular groove 240 into which a lug 241 formed upon the cam member 237 projects. The cam member 237 is secured to the flange 238 by a bolt 242.

The clutch member 239 is provided with jaws which are engageable with jaws 245 formed upon a clutch member 246 which is keyed to the shaft 210. The clutch member 239 is journaled on the shaft 210.

A bracket member 248 secured to the bracket member 212 (Figs. 4 and 8) journals a pin 249 to which bifurcations 250 provided at one end of a lever 251 are fixed. The bifurcations 250 are provided with pins 252 which ride in an annular groove 253 formed in the clutch member 239. The free end of the lever 251 is provided with an armature 255 operatively disposed with respect to a pair of co-operating electro-magnets 256 mounted above the housing 200. The construction is such that when the armature is attracted by the electro-magnets 256, the lever 251 will be displaced angularly in a counter-clock-wise direction (Fig. 4) against the action of a spring 258 and the pins 252 will displace the clutch member 239 to bring its jaws into engagement with the jaws provided on the clutch member 246. When the electro-magnets 256 are de-energized, the spring 258 will retract the lever 251, and the clutch members 239 and 246 will be disengaged from each other.

A pin 260 projecting from the bracket member 248 is adapted to engage the surface 261 at one end of the clutch member 239, the surface 261 being provided with a notch 262 adapted to receive the pin 260 when the clutch members 239 and 246 are disengaged from each other.

As best shown in Figs. 4, 5 and 6, a pinion 270 keyed to the sleeve 217 meshes with an idler gear 271 which, in turn, meshes with an idler gear 272. The idler gear 272 meshes with an idler gear 273 which meshes with a gear 274 fixed to the batt-feeding roll I'. Another gear 275 secured to the roll I' meshes with a gear 276 secured to the batt-feeding roll I.

Referring now to Fig. 5, a pair of electro-magnets 280 are provided with an armature 281 carried on the free end of a lever 282, which has its other end pivoted on a pin 283. The pin 283 projects from a bracket 284 secured to the housing 200. Formed in the lever 282 is an angular slot 285 in which a pin 286 rides. The pin 286 projects from the free end of the lever 287 which has its other end fixed to the shaft 234.

Mounted on the lever 282 is a leaf spring contact member 290 which engages a leaf spring contact member 291 when the levers 282 and 287 are in the positions wherein they are shown in Fig. 5. The contact member 291 is carried by a post 293 which projects from the housing 200.

It will be readily understood that if the electro-magnets 256 are energized they will attract their armature 255 and angularly displace the lever 251 against the action of the spring 258 to bring the clutch jaws of the clutch member 239 into engagement with the clutch jaws 245. Such engagement of the clutch jaws of the member 239 with the clutch jaws 245 will cause the clutch member 239 to make one complete revolution with the shaft 210. During the complete revolution of the clutch member 239 the cam member 237 displaces the rod 231 in a direction away from the shaft 210 and causes the shaft 234 to rotate in a clock-wise direction (Fig. 6) so that the lever 287 is angularly displaced in a like direction. Such displacement of the lever 287 causes the pin 286 to displace the lever 282 in a counter clock-wise direction (Fig. 5) to bring the armature 281 into a position wherein it may be retained by the electro-magnets 280 if they are energized at that time. As soon as the electro-magnets are deenergized, the spring 220 acting through the clutch member 216 and the rod 231 returns the levers 287 and 282 to the positions wherein they are shown in Fig. 5. It will be noted that when the armature 281 is displaced toward the electro-magnets 280, the contact member 290 is disengaged from the contact member 291.

Referring to Fig. 6, it will be noted that when the rod 231 has been displaced by the cam 237 to rotate the shaft 234 in a clock-wise direction, the fork 230 holds the clutch member 216 in a position wherein its clutch jaws do not engage the clutch jaws of the clutch member 215. The sleeve 217 will then cease to rotate and the batt-feeding rolls I and I', driven through the gears associated with the pinion 270, will also cease to rotate and thus cause the batts to be severed at the shearing edge J, it being understood that the batt-feeding roller H continues to rotate and that the batt-feeding rolls I and I' are driven from the shaft 205 when the clutch members 215 and 216 functionally engage each other. When the cam 237 passes from beneath the roller 236, the rod 231 is not necessarily displaced by the action of the spring 220 through the fork 230 for as long as the electro-magnets 280 are energized, the levers 282 and 287 will co-operate by means of the connection at the slot 285 in lever 282 and hold the rod 231 in the upper position wherein it is shown in Fig. 6. When the rod is in this position, the clutch member 216 is held disengaged from the clutch member 215.

The electrical circuit for the electro-magnets 256 and 280 is illustrated diagrammatically in Fig. 5. It will be noted that the electro-magnets 256 are arranged in parallel with each other and that electro-magnets 280 are arranged in parallel with each other, one terminal of each of the electro-magnets being grounded to the framework A. One terminal of each of the electro-magnets 280 is connected to the contact member 291 and one terminal of each of the electro-magnets 256 is connected to the contact member 290. The last mentioned terminals of the electro-magnets 280 are also connected permanently to one terminal of a storage battery 300, or the equivalent, which has its other terminal connected to a metallic curtain or mesh 301, the metallic curtain or mesh 301 being suspended from a bar 303 formed from electrical insulation. The mesh 301 extends transversely (at a slight angle) across the bed of the machine so that its lower end will contact with the ridge bars B² when they are not covered by the pre-cut covers M'. The ridge bars are grounded to the frame A.

Briefly, the operation of the transmission mechanism W is as follows: if it is assumed that one of the pre-cut covers M' is traveling over the ridge bars B² as illustrated diagrammatically in Fig. 5 so that the metallic mesh 301 is held out of engagement with the ridge bars, it will be readily understood that no current will flow through the electro-magnets 256 and 280. The spring 220 will then hold the clutch member 216 in effective engagement with the clutch member 215 and the roller 236 will rest upon the periphery of the clutch member 246 at a point spaced from the cam member 237, the clutch member 246 being stationary at this time as its clutch jaws 245 are not engaged by the clutch jaws of the clutch member 239. The shaft 205 will be rotated through the medium of the sprocket chain 202, the worm 203 and the worm gear 204. This rotation of the shaft 205 will be transmitted to the sleeve 217 through the clutch members 215 and 216. The sleeve 217 will drive the pinion 270 and it, in turn, will drive the idler gears 271, 272 and 273 to drive the roll I'. The gear 274 on the roll I' will drive the gear 276 fixed to the roll I. Then, as the machine continues to function, the pre-cut cover M' will be advanced along the ridge bars until the metallic mesh 301 will engage one of the ridge bars B² and close the circuits through the electro-magnets 256 and 280. The electro-magnets 256 will be energized by current flowing from the battery 300 through the contact member 291, the contact member 290, the electro-magnets 256, the frame A, one or more ridge bars B² and thence through the wire mesh 301 to the battery 300. Simultaneously, a current will flow from the battery 300 through the electro-magnets 280, the frame A, one or more of the ridge bars B² and thence through the wire mesh 301 back to the battery 300. When the electro-magnets 256 are energized in this manner, they cause the clutch jaws of the clutch member 239 to engage the clutch jaws 245 in the manner described above and this engagement of these clutch jaws causes the clutch member 239 to make one complete revolution with the shaft 210 so that the rod 231 will be displaced to rotate the shaft 234 in a clock-wise direction (Fig. 6) and to cause the fork 230 to disengage the clutch member 216 from the clutch member 215. Of course, the feed rolls I and I' will cease to rotate as soon as the clutch member 216 is disengaged from the clutch member 215 and, as explained above, the clutch member 216 will be held out of effective engagement with the clutch member 215 until the electro-magnets 280 are subsequently de-energized. They will be de-energized when the next pre-cut cover fabric M' passes beneath the metallic mesh 301 and lifts it from the ridge bars B². The feed rolls I and I' will then resume their task of feeding the batts to the continuously driven feed roll H.

From the foregoing it will be readily understood that the feeding of the batts will be interrupted periodically. The timing of the apparatus is such that batts of substantially any desired length may be supplied in connection with the pre-cut covers so that there will not be any waste of the batt material. In the event a pre-cut cover is not placed upon the ridge bars B² at the proper time during the operation of the machine, no batts will be advanced, although the lining fabric continues to advance.

Referring now to Figs. 9 and 10, it will be noted that the bar 303 which carries the metallic mesh 301 has one end pivoted to an arm 310 of a bell crank lever 311 having another arm 312. The lever 311 is pivoted to a bracket 314 secured to the concave H'. The other end of the bar 303 is provided with a pin 315 which rides in a slot 316 formed in an arm 317 of a bell crank lever 318 having a second arm 319. The bell crank lever 318 is pivoted to a bracket 320 secured to the concave H'. Associated with the arm 312 is a nut 325 which is screw threaded on a rod 326, the rod 326 being journaled in a bearing member 327 and a tubular member 328. The tubular member 328 is journaled in a bearing member 330. The bearing members 327 and 330 are secured to the concave H'. A nut 333 associated with the arm 319 is screw threaded on the tubular member 328. The screw threads on the rod 326 and the tubular member 328 are cut in opposite directions.

The nut 325 is provided with a pin 336 which rides in a slot 337 formed in the arm 312. The nut 333 is provided with a pin 338 which rides in a slot 339 formed in the arm 319.

The tubular member 328 is held against longitudinal displacement by a collar 340 and a bevel gear 341, both of these members being secured to the tubular member and being disposed at opposite sides of the bearing member 330. Meshing with the gear 341 is a bevel gear 343 pinned to a shaft 344 which is journaled in a bracket member 345. A gear 347 fixed to the shaft 344 is engageable by a gear 348 splined to a shaft 349 which is also journaled in the bracket 345. The shafts 344 and 349 are provided with knobs 350 and 351, respectively, the knob 351 being secured to the gear 348 so that it may be displaced therewith longitudinally of the shaft 349, when the gear 348 is to be brought into mesh with the gear 347.

A bevel gear 355 pinned to the shaft 349 meshes with a bevel gear 356 pinned to the rod 326. The rod 326 is held against longitudinal displacement relative to the tubular member 328 by a collar 360 and a spacing sleeve 370, the spacing sleeve 370 being disposed between the bevel gears 341 and 356.

The construction illustrated in Figs. 9 and 10 is such that one may displace the gear 348 to engage or mesh with the gear 347 and then either of the knobs 350 or 351 may be rotated manually to shift the bar 303 bodily toward the front or back of the machine. In other words, the bar 303 and the metallic mesh 301 are displaced as a unit longitudinally of the machine. Obviously, the batt-feeding apparatus may be adjusted in this manner to have the breaks in the batts occur at the spaces between adjacent pre-cut covers M' advanced over the ridge bars B'. If the gears 347 and 348 are disengaged from each other, the knob 350 may be rotated to displace the left hand end (Figs. 9 and 10) of the fabric longitudinally of the ridge bars in either direction. Likewise, the knob 351 may be rotated to displace the right hand end of the metallic mesh 301 longitudinally of the ridge bars in either direction. Such adjustment of the metallic mesh by manipulating one or the other of the knobs 350 and 351 varies the angle which the metallic mesh makes with a plane extending transversely through the machine. This angle determines the spacing between successive batts. In practice, the machine is preferably adjusted so that the batts are shorter than the pre-cut covers. This makes it unnecessary to pluck the batt-material from the ends of the pre-cut covers before the ends are sewed to the lining fabric. However, it is readily understood that the batts may be as long as the pre-cut covers if it is so desired.

Figure 12 illustrates the manner in which the product of the improved apparatus is delivered therefrom. The lining fabric P is continuous, the pre-cut cover fabrics M' being secured to the lining-fabric in spaced relation with each other. The batts $Q^5$ are shown to be shorter in length than the pre-cut covers so that it is unnecessary to pluck the ends of each individual piece of upholstery before the ends are sewed.

Referring now to Fig. 13 wherein mechanism is shown which may be employed in place of the mechanism illustrated in Figs. 9 and 10, the reference characters 326a and 328a designate a rod and a tubular member, respectively, which are preferably identical in construction with the rod 326 and the tubular member 328, respectively, described above. At their right hand ends (Fig. 13), the rod 326a and the tubular member 328a are connected to mechanism (not shown) which is identical with the mechanism shown in Figs. 9 and 10 for rotating the rod 326 and the tubular member 328.

This mechanism (not shown) connected to the rod 326a and the tubular member 328a permits one to rotate either the rod or the tubular member in either direction by itself or to rotate both parts simultaneously.

Screw threaded upon the left hand end of the tubular member 328a is a nut 333a which has a pin and slot connection with an arm 319a of a bell crank lever 318a which also comprises an arm 317a. A pin 315a which projects from the free end of the arm 317a rides in a slot 316a provided in a bar 303a which is formed from electrical insulation. Suspended from the bar 303a is a metallic mesh or curtain 301a which is similar in construction and has the same function as the mesh 301 described above. The left hand end of the bar 303a is pivoted to a bracket 327a which is mounted in the same manner as the bracket 327 described above.

A nut 325a screw threaded upon the rod 326a has a pin and slot connection with an arm 312a of a bell crank lever 311a which comprises a second arm 310a. Adjustably secured to the free end of the arm 310a is a link 310b to which a short bar 303b is adjustably secured by a screw 310d. The means for adjustably securing the link 310b to the arm 310a is a screw 310c. Suspended from the bar 303b is a metallic mesh or curtain 301b which has the same function as the metallic mesh or curtain 301 described above.

It will be readily understood that the mechanism (not shown) connected to the right hand ends (Fig. 13) of the rod 326a and the tubular member 328a may be manipulated by means of knobs (not shown) identical in construction with the knobs 350 and 351, described above, to displace angularly either of the levers 311a and 318a around their pivotal axes to adjust them to cause a break in the batts of the desired length. In other words, the length of the batts may be varied by adjusting either of the bars 303a and 303b. When the point at which the break in the batts occurs is to be shifted longitudinally of the machine to correspond to pre-cut covers M' of a certain length, the bars 303a and 303b are shifted as a unit longitudinally of the machine.

Another form of the invention is illustrated in

Figs. 14 to 17, inclusive. With the exception of the means for driving the batt-feeding rollers I and I', the machine which embodies this invention is identical in construction with the machine illustrated in Figs. 1 to 11, inclusive. Like parts in the two machines are identified by like reference characters. It will be noted that the shaft $L^{18}$ of the machine shown in Figs. 1 to 11, inclusive, has been replaced by a shaft $L^{118}$ which resembles the similar shaft of the machine shown in the above identified co-pending application. The shaft $L^{118}$ is driven from the lower feed roll E by a chain $L^{117}$. A gear 67 fixed to the shaft $L^{118}$ has the same function as the gear 67 forming part of the machine illustrated in Figs. 1 to 11, inclusive. Journaled on the shaft $L^{118}$ is a sleeve 400 to which a sprocket wheel 401 is fixed. A clutch collar 402 splined on the sleeve 400 is provided with clutch jaws 403 which are engageable with clutch jaws 404 formed on a clutch member 405 which is fixed to the outer end of the shaft $L^{118}$. A spring 408 disposed around the sleeve 400 yieldingly urges the clutch collar 402 toward the clutch member 405.

Pivoted intermediate its ends on a bracket 410 is a clutch lever 411. One end of the lever 411 engages an annular groove formed in the clutch collar 402, the other end of the lever 411 being provided with an armature 412 operatively disposed with respect to an electro-magnet 414. The construction is such that when the electro-magnet 414 is energized, it attracts the armature 412 and the lever 411 retracts the clutch 402 against the action of the spring 408. When the electro-magnet 412 is de-energized, the spring 408 displaces the clutch collar 402 into a position wherein its clutch jaws engage the clutch jaws 404.

A sprocket chain 415 connects the sprocket wheel 401 with a sprocket wheel 416 fixed to the roll I'. A gear 417 fixed to the roll I' meshes with a gear 418 fixed to the roll I. It will be readily understood that when the electro-magnet 414 is de-energized, the rolls I and I' will be driven from the shaft $L^{118}$ through the clutch mechanism associated with that shaft and through the sprocket chain 415.

In this embodiment of the invention the perforate belt of the conveyor B is replaced by three belts 420, 421 and 422, the outer belts 420 and 422 being spaced from the intermediate belt 421 to provide slots or spaces 425 and 426 between the belts. (Fig. 15.) As best shown in Figs. 14 and 15, photo-electric tubes 430 and 431 are disposed within the conveyor B and register with the slots 425 and 426, respectively, the photo-electric tubes 430 and 431 being mounted in bases 433 and 434, respectively, which are screw threaded upon rods 435 and 436, respectively. The lower ends of the bases 433 and 434 slidably engage bars 437 which prevent the photo-electric tubes from being angularly displaced around the longitudinal axes of the rods 435 and 436. Each of the rods 435 and 436 is provided with a bevel gear 440 which meshes with a bevel gear 441 fixed to a shaft 442. The outer end of each shaft 442 is provided with a hand wheel 443. The hand wheels 443 may be rotated to displace the photo-electric tubes longitudinally in either direction along the rods 435 and 436.

Disposed above each of the tubes 430 and 431 is a lamp 448 adjustably mounted on a bracket 449, the bracket 449 being mounted on the concave H'.

As illustrated diagrammatically in Fig. 17, the tube 430 is operatively connected to an electro-magnet 450, the tube 431 being operatively connected to an electro-magnet 451. The means for operatively connecting the photo-electric tubes to the electro-magnets are shown conventionally as the details thereof do not form a part of this invention. It may be mentioned, however, that these means preferably comprise three element vacuum tubes 454 and 455 which amplify the currents of the photo-electric tubes 430 and 431, respectively.

The electro-magnets 450 and 451 are parts of relays 460 and 461 which also comprise armatures 464 and 465, respectively, which are engageable with the contact points 462 and 463, respectively. When the electro-magnets 450 and 451 are de-energized, springs 470 and 471 hold the armatures 464 and 465, respectively, disengaged from the contact points 462 and 463, respectively. The relays 460 and 461 control the electro-magnet 414 through circuits which include storage batteries 475 and 476, respectively, or the equivalent, for the purpose.

One terminal of the storage battery 475 is connected to a terminal of the electro-magnet 414 which has its other terminal connected to the armatures 464 and 465. One terminal of the battery 476 is connected to the first mentioned terminal of the electro-magnet 414. The other terminals of the storage batteries 475 and 476 are connected to the contact points 462 and 463.

When the photo-electric tube 430 is subjected to the light of the lamp 448, a current flows through the tube 430 and is amplified by the three element vacuum tube 454 to such an extent that the electro-magnet 450 is energized and attracts its armature 464 into a position wherein it engages the contact point 462. Likewise, when the photo-electric tube 431 is subjected to the light of the lamp 448 associated with it, the current of the photo-electric tube 431 is amplified and the electro-magnet 451 is energized so that it attracts its armature 465 into a position wherein it engages the contact point 463. Whenever either or both of the circuits through the contact points 462 and 463 are closed by the armatures 464 and 465, respectively, the electro-magnet 414 is energized and the clutch jaws 403 of the clutch collar 402 are disengaged from the clutch jaws 404 of the clutch member 405. The batt-feeding rolls I and I' then stop and effect a severance of the batts at the shearing edge J.

The operation of the apparatus shown in Figs. 14 to 17, inclusive is as follows: whenever a precut cover M' passes between the photo-electric tubes 430 and 431, the photo-electric tubes are not subjected to the light of the lamps 448 and the electro-magnets 450 and 451 are not energized. When this condition obtains, the batt-feeding rolls I and I' are driven in synchronism with the batt-feed roll H. However, as soon as the pre-cut cover has advanced far enough to uncover one of the photo-electric tubes, one of the electro-magnets 450 or 451 is energized so that the electro-magnet 414 becomes energized. The batt-feeding rolls I and I' then cease to rotate and the batts are severed at the shearing edge J. The photo-electric tubes 430 and 431 are spaced from each other longitudinally of the machine and the distance they are spaced from each other determines the space left between the batts of pre-cut covers advanced consecutively through the machine. The photo-electric tubes 430 and 431 may be displaced longitudinally of the machine by manipulating the hand wheels 443. They may be adjusted to vary the gap between adjacent batts and also to have the gaps occur in the proper positions with respect to the pre-cut covers.

Another embodiment of the invention is illustrated in Figs. 18 to 23, inclusive. This embodiment of the invention comprises apparatus which, with the exception of the means for controlling the auxiliary batt-feeding rolls I and I', is substantially identical with the apparatus shown in Figs. 1 to 11, inclusive. In Figs. 18 to 23, inclusive, those parts which are substantially duplicates of the parts shown in Figs. 1 to 11, inclusive, are identified by the same reference characters.

In the machine illustrated in Figs. 18 to 23 inclusive, and Fig. 19A, the lower feed roll E drives the shaft $L^{218}$ through a sprocket chain $L^{217}$. The shaft $L^{218}$ is provided with a sleeve 500 with which a sprocket wheel 501 is formed integral. The sleeve is rotatably journaled on the shaft $L^{218}$. Splined to the sleeve 500 is a clutch collar 502 provided with clutch teeth 503 which are engageable with clutch teeth 504 of a clutch member 505. Formed integral with the clutch member 505 is a sprocket wheel 506. The clutch member 505 is fixed to the shaft $L^{218}$. The sprocket wheel 501 drives the batt-feeding roll I' through a sprocket chain 510. The sprocket wheel 506 drives a shaft 511 through a sprocket chain 512. (See Fig. 19.) Fixed to the shaft 511 is a clutch member 514 having teeth which are engageable with the teeth of a clutch collar 515, the clutch member 514 being slidably and rotatably journaled upon the shaft 511. A clutch lever 520, which operatively engages the clutch collar 515, is fixed to a tubular member 521 which is slidably journaled in the frame A. At its left hand end (Fig. 19), the tubular member 521 has one end of a lever 523 pivoted to it, the lever 523 being pivoted intermediate its ends on a bracket member 524 fixed to the frame A. The lever 523 operatively engages the clutch collar 502. A spring 507 disposed around the sleeve 500 is interposed between the sprocket wheel 501 and the clutch member 502. This spring yieldingly urges the clutch collar 502 toward the clutch member 505.

Telescoping into the right hand end (Fig. 19) of the tubular member 521 is a rod 530 which is reciprocable in the tubular member 521 and in a bracket 532 fixed to the frame A. The outer end of the rod 530 is pivotally connected to a sleeve 534 disposed around an eccentric 535 which is fixed to one end of a shaft 537. The shaft 537 is provided with a bevel gear 538 which meshes with a bevel gear 539. The bevel gear 539 is constrained to rotate with the batt-feeding roll H which is driven continuously as described in connection with Figs. 1 to 11, inclusive. It may be mentioned at this point in the description, that the batt-feeding roll I is driven by a gear 540 which meshes with a gear 541 constrained to rotate with the batt-feeding roll I'.

Secured to the concave H' are spaced bracket members 550 in which are journaled the end portions of a rock shaft 551. A rearwardly extending finger providing a dog 553 is slidably mounted on the rock shaft 551 and has its end portion disposed within slotted keeper 554 depending from the tube 521 (Figs. 19–21). The rock shaft is further provided with a fixedly mounted forwardly extending lever arm 556 to which is pivotally connected an L-shaped arm 557. Projecting through one leg of the L-shaped member 557 is a rod 558 which is bent as at 559 to prevent it from being withdrawn from the L-shaped member. The lower end of the rod 558 is pivoted to an arm 560 of a bell crank lever 561 which is pivoted to the concave H' and has a depending arm 562. The lower end of the arm 562 is engageable by the pre-cut covers M' as they travel over the ridge bars $B^2$. When the arm 562 is not in engagement with a pre-cut cover, it assumes the position wherein it is shown in Fig. 20 so that the free end of the dog 553 occupies the position wherein it is shown in full lines in Fig. 20. When a pre-cut cover M' advances over the ridge bars $B^2$, it comes into contact with the free end of the arm 562 and displaces the bell crank lever 561 angularly in a clock-wise direction (Fig. 20) so that the rod 558 moves upwardly and its bent portion 559 permits the L-shaped member 557 to be elevated by the weight of the dog 553 which moves into the position wherein it is shown in dotted lines (Fig. 20).

Referring to Figs. 19, 22 and 23, it will be noted that one end of the clutch member 515 is provided with a notch 565 adapted to receive a pin 566 projecting from a bracket 567 fixed to the frame A. When the pin 566 engages the end surface of the clutch member 515, it holds the clutch member 515 in a position wherein its teeth engage the teeth of the clutch member 514. However, when the clutch collar 515 is displaced in a direction away from the clutch member 514 and the pin 566 enters the slot 565, the teeth of the clutch collar 515 will be disengaged from the teeth of the clutch member 514.

The operation of the apparatus shown in Figs. 18 to 23, inclusive, is substantially as follows: if it is assumed that the bell crank lever 561 is displaced to the position wherein it is shown in dotted lines (Fig. 20) by a pre-cut cover M' passing beneath it, it will be readily understood that the dog 553 occupies the position wherein it is shown in dotted lines (Fig. 20) and the rod 530 is reciprocated by the eccentric 535 and does not engage the dog. The spring 507 then holds the clutch collar 502 in engagement with the clutch member 505 so that the batt-feeding rolls I and I' are driven through the medium of this clutch mechanism and the sprocket chain 510. The lever 523, acting under the action of the spring 507, holds the tubular member 521 in a position wherein it causes the clutch lever 520 to hold the clutch collar 515 disengaged from the clutch member 514. When the clutch collar 515 is disengaged from the clutch member 514, the pin 566 is disposed in the notch 565 and holds the clutch collar 515 against rotation. Now, if it is assumed that the pre-cut cover passes from beneath the lever 562 so that the lever assumes the position wherein it is shown in full lines (Fig. 20), it is readily understood that the dog 553 will move to its upper position and will be engaged by the free end of the rod 530 during its next reciprocation. The rod 530 will displace the dog 553 and the tubular member 521 to the left (Fig. 19) against the action of the spring 507 and bring the clutch collar 515 into engagement with the clutch member 514. Simultaneously, the clutch collar 502 will be disengaged from the clutch member 505 so that the batt-feeding rolls I and I' will cease rotating and will cause the batts to be severed at the shearing edge J. When the clutch collar 515 is brought into engagement with the clutch member 514, the pin 566 leaves the notch 565 and cannot return into it until the clutch collar 515 has made a complete revolution. If, at the end of the complete revolution, the bell crank lever 561 is again displaced by a pre-cut cover, the dog 553 will drop to its lower position and the clutch collar 515 will be disengaged from the clutch member 514 while the clutch collar 502 is being brought into engagement with the clutch member 505 so that the feeding of the batts will be resumed. However, if, after the clutch collar 515 has made one complete revolution, the bell crank lever 561 is not engaged by a following pre-cut cover, the dog 553 will remain in its uppermost position and even though the clutch 515 is momentarily disengaged from the clutch member 514, it will be brought into engagement therewith due to the action of the rod 530 which engages the dog 553 and displaces it and the tubular member 521 to the left (Fig. 19).

The space between the batts of adjacent pre-cut covers will be determined by the speed of the shaft 511. Obviously, this speed will also control or determine the length of the batts as compared with the lengths of the pre-cut covers.

While I have shown and described certain embodiments of my invention, it is to be understood that it is capable of many modifications. Changes, therefore, in the construction and arrangement may be made without departing from the spirit and scope of the invention and disclosed in the appended claims, in which it is my intention to claim all novelty inherent in my invention as broadly as possible, in view of the prior art.

I claim:

1. In the manufacture of a series of stuffed, pleated articles, the method which comprises feeding a continuous lining fabric, batts and pre-cut covers, severing the batts at intervals, and employing said pre-cut covers as an instrumentality in determining the periodicity, which may vary, of the stopping of the feed and severance of the batts, and also a resumption of the feed of the unsevered portions of the batts.

2. In a machine of the character set forth, the combination with means for feeding a lining fabric, pre-cut covers and batting strips, and effecting severance of the batts; of means including an electric circuit controlling the means for effecting severance of the batts, said electrical circuit comprising a contacting member controlled by said covers and dependent for its effect upon the length and spacing of said covers.

3. In a machine of the character set forth, the combination with means for feeding a lining fabric, pre-cut covers and batting strips, and effecting severance of the batts; of cover-controlled electrically operated means including a photo-electric tube controlling the means for effecting severance of the batts, the effect of said photo-electric tube being dependent upon the length and spacing of said covers.

4. In a machine of the character set forth, the combination with means for feeding a lining fabric, pre-cut covers and batting strips, and effecting severance of the batts; of cover-controlled electrically operated means including a plurality of spaced photo-electric tubes controlling the means for effecting severance of the batts and dependent for their effect on the length and spacing of said covers; and means for varying the spacing of the tubes.

5. In a machine of the character set forth, the combination with means for feeding the lining fabric, pre-cut covers and batting-strips, and effecting severance of the batts; of means including a photo-electric tube responsive to a light beam which is interrupted by the movement of said covers whereby the length and spacing of the covers serves to control the severance and feeding of the batting-strips.

6. In a machine of the character set forth, the combination with means for feeding a lining fabric, pre-cut covers and batting-strips, and effecting the severance of the batts; of cover-controlled means wholly controlling the means for feeding and effecting severance of the batts; and means for adjusting the cover-controlled means to vary the lengths of the batts with respect to the length of the covers.

7. In a machine of the character set forth, the combination with means for feeding a lining fabric, pre-cut covers and batting-strips, and effecting the severance of the batts; of means dependent on the length and spacing of the covers serving to control the feeding and severance of the batts; and means for adjusting said dependent means to vary the lengths of the batts with respect to the lengths of the covers.

8. In a machine of the character set forth, the combination with means for feeding a lining fabric, pre-cut covers and batting-strips, and means for effecting severance of the batts; of ridge-bars over which said covers are advanced; means co-operating with said ridge-bars for forming seam-ridges in said covers; an electrical contact member engageable with at least one of said ridge-bars, said contact member being engageable by said covers to disengage it from said ridge-bar; and electrically operated means controlled by said contact member controlling the means for effecting severance of the batts.

9. In apparatus for forming upholstery, means for continuously feeding lining fabric, means for feeding pre-cut covers to said lining fabric, means for feeding a continuous strip of batting material, means controlled by and dependent on the length and spacing of said pre-cut covers for cutting said batting material into lengths corresponding to the lengths of the pre-cut covers, and means for feeding said severed lengths of batting material between said lining fabric and said pre-cut covers.

10. In apparatus for forming upholstery, means for continuously feeding lining fabric, means for feeding pre-cut covers to said lining fabric, means for feeding a continuous strip of batting material, means controlled by and dependent upon the length and spacing of said pre-cut covers for cutting said batting material into lengths corresponding to the lengths of the pre-cut covers, means for feeding said severed lengths of batting material between said lining fabric and said pre-cut covers, and means for securing said pre-cut covers to said lining fabric.

11. In apparatus for forming upholstery, means for feeding lining fabric, means for feeding pre-cut covers to said lining fabric, means for advancing a continuous strip of batting material, and means controlled by the pre-cut covers for stopping the feeding of said batting material.

12. In apparatus for forming upholstery, means for feeding lining fabric, means for feeding pre-cut covers to said lining fabric, means for advancing a continuous strip of batting material, means controlled by and dependent upon the length and spacing of the pre-cut covers for starting and stopping the feeding of said batting material, and means for securing said pre-cut covers to said lining fabric.

13. In apparatus for forming upholstery, means for feeding a lining fabric, means for feeding pre-cut covers to said lining fabric, and means controlled by and dependent upon the length and spacing of said pre-cut covers for feeding lengths of batting material between said lining material and said pre-cut covers.

14. In apparatus for forming upholstery, means for feeding a lining fabric, means for feeding pre-cut covers to said lining fabric, and electrically operated means controlled by and dependent upon the length and spacing of said pre-cut covers for feeding lengths of batting material between said lining material and said pre-cut covers.

15. In apparatus for forming upholstery, means for continuously advancing a lining fabric and forming seam-ridges therein, means for feeding pre-cut covers to said lining fabric, means controlled by and dependent upon the length and spacing of said pre-cut covers for feeding lengths of batting material between said lining fabric and said pre-cut covers, and means for securing the seam-ridges of said lining fabric to said pre-cut covers.

16. In apparatus for forming upholstery, means for continuously advancing a lining fabric, means for forming seam-ridges in pre-cut covers and feeding them to said lining fabric, means controlled by and dependent upon the length and spacing of said pre-cut covers for feeding spaced lengths of batting material between said pre-cut covers and said lining fabric, and means for securing the seam-ridges of said pre-cut covers to said lining fabric.

17. In apparatus for forming upholstery, means for continuously feeding lining fabric, means for feeding pre-cut covers to said lining fabric, means for advancing a continuous strip of batting material, and means controlled by and dependent upon the length and spacing of each pre-cut cover for severing a length of batting material from said strip thereof and placing it between the lining fabric and the pre-cut cover and in spaced relation with respect to the preceding and succeeding lengths of batting material.

18. In apparatus for forming upholstery, means for feeding a lining fabric, means for feeding pre-cut covers to said lining fabric, means for intermittently advancing a continuous strip of batting material, and electrically operated means for starting and stopping said advancing means and severing lengths of said batting material from said strip thereof and placing them between said lining fabric and said pre-cut covers.

19. In apparatus for forming upholstery, means for supplying lining fabric, means for feeding pre-cut covers to said lining fabric, means holding a supply of batting material, and means controlled by and dependent upon the length and spacing of said pre-cut covers whereby each pre-cut cover causes the severance of a length of said batting material from said supply thereof and permits it to be properly positioned between said lining fabric and the pre-cut cover.

20. In a machine of the character set forth: means for feeding a continuous lining fabric; means for feeding pre-cut covers; batt-feeding and severing means for feeding continuous batts, effecting severance thereof, and stopping and initiating the feed of the unsevered portions; and a control device for said batt feeding and severing means controlled by said pre-cut covers, the advance end portion of each cover determining the initiation of the feeding of the batts and the rear end portion of each cover determining the time of severance and the stoppage of the feed of the unsevered portions of the batts.

21. In upholstery manufacture, the steps which comprise: feeding batts and pre-cut covers at spaced intervals; severing the batts and retarding the feed of the unsevered portions thereof; and utilizing the length and spacing of the covers to control the severance of the batts and also to control the resumption of feed, whereby variable spacing of the covers results in corresponding variable spacing of the batts.

22. In upholstery manufacture, the steps which comprise: feeding continuous batts and severing the same into successive sections; feeding pre-cut covers at spaced intervals; and electrically controlling the severance of the batts, the stoppage of feed of the unsevered portions, and the resumption of feed, by said covers; the rear edge portion of the covers determining the instant of severance and the advance edge portion determining the instant of resumption of the feed of the batts.

23. The method as specified in claim 22, characterized by employing one electric circuit to effect the disengagement of a clutch and effect stoppage of the feed of the continuous strips of batts and severance of the batts, and employing another electric circuit to control resumption of feed of the continuous strips of batts.

24. In upholstery manufacture the steps which comprise: pneumatically gripping pleat-fulnesses of successive pre-cut cover fabrics having raised seam-portions intervening between the pleat fulnesses, and advancing the covers thus gripped; bringing a second fabric into position over the first mentioned fabric and into engagement with the seam-portions thereof; feeding strips of batts into said pleat-fulnesses as the fabrics advance to the place where the second fabric is applied; severing the batts into successive sections; and utilizing the length and spacing of the covers to control the severance of the batts and also to control the resumption of feed, whereby variable spacing of the covers results in corresponding variable spacing of the batts.

25. In upholstery manufacture, the steps which comprise: pneumatically gripping pleat-fulnesses of successive pre-cut cover fabrics having raised seam-portions intervening between pleat-fulnesses, and advancing the covers thus gripped; bringing a second fabric into position over the first mentioned fabric and into engagement with the seam-portions thereof; feeding strips of batts into said pleat-fulnesses as the fabrics advance to the place where the second fabric is applied; severing said batts into successive sections; and electrically controlling the severance of the batts, the stoppage of feed of the unsevered portions, and the resumption of feed, by means of said covers, the rear edge portion of the covers determining the instant of severance and the advance edge-portion determining the instant of resumption of the feed of the batts.

26. A machine for making pleated upholstery comprising: a frame provided with an endless suction-belt and spaced stationary ridge bars whereby pleat-fulnesses in pre-cut cover fabrics may be suctionally gripped and intervening seam-portions maintained in relatively elevated position as said covers are advanced by said belt; means for feeding continuous strips of batts into engagement with said covers; and automatically controlled batt-feeding and severing means, the automatic control being effected through the medium of pre-cut covers and dependent for its action upon the length and spacing of said covers.

27. Mechanism as specified in claim 26, in which the automatic control comprises electrical devices having circuits equipped with a contact brush adapted to engage said ridge-bars to complete the circuit.

28. Mechanism as specified in claim 26, in which the automatic control comprises electrical devices having circuits, one of which controls the stoppage of the batt-feeding mechanism and the other controls the resumption of the feed.

29. A machine as specified in claim 26, in which the batt-feeding and severing means is automatically controlled by means of electrical circuits equipped with a contact brush, and transmission mechanism is employed for actuating the batt-feeding and severing mechanism, said transmission mechanism being equipped with an electro-magnet in a circuit with said brush and serves to shift an auxiliary clutch which throws into operation a power actuated device which serves to disengage a main clutch of the transmission mechanism and to close a keeper of a second electro-magnet with which the transmission mechanism is equipped, said second electro magnet being connected to said contact brush and serving to hold the main clutch disengaged while the brush passes onto the advance margin of the next succeeding pre-cut cover.

30. In a machine of the character set forth, the combination with means for feeding a lining fabric, pre-cut covers and batting strips, and means for effecting severance of the batts; of a frame over which said covers are advanced, said frame being an electrical conductor; an elongated flexible contact member disposed so as to be engageable with said frame to complete a circuit and said circuit being interrupted by an advancing cover; and electrically operable means in said circuit for controlling the means for effecting severance of the batts.

31. A machine as specified in claim 30 in which means is provided for varying the angle of the flexible contact member with respect to the path of the covers so that the length of the severed batts may be varied with respect to an associated pre-cut cover.

32. A machine as specified in claim 30, in which means is provided for adjusting the position of the contact member longitudinally of the frame so that the position of an advancing severed batt may be varied with respect to the associated advancing pre-cut cover.

33. A machine as specified in claim 30, in which means is provided for varying the position of the contact member longitudinally and angularly of the table so that the length and position of an advancing severed batt may be varied with respect to an associated advancing pre-cut cover.

34. In a machine of the character set forth, the combination with means for feeding a lining fabric, pre-cut covers and batting strips, and effecting severance of the batts; of means including a lever displaceable by engagement with said pre-cut covers and dependent for its effect upon the length and spacing of said covers for controlling the means for feeding and effecting severance of the batts.

ALLISTER S. MITCHELL.